July 20, 1965 J. B. GUNN 3,196,405

VARIABLE CAPACITANCE INFORMATION STORAGE SYSTEM

Filed Dec. 18, 1961

INVENTOR
JOHN B. GUNN

BY [signature]

ATTORNEY

United States Patent Office 3,196,405
Patented July 20, 1965

3,196,405

VARIABLE CAPACITANCE INFORMATION STORAGE SYSTEM

John B. Gunn, Yorktown Heights, N.Y., assignor to International Business Machines Corporation, New York, N.Y., a corporation of New York Filed Dec. 18, 1961, Ser. No. 160,173
3 Claims. (Cl. 340—173)

The present invention relates to a method and apparatus for storing binary information signals. More particularly it relates to such a method and apparatus utilizing variable capacitance elements to perform the storage function.

Storage matrices and the individual elements which form such matrices are basic to all computer systems both for long and short duration signal storage. The computer industry is accordingly continually engaged in research to develop improved types of storage systems from the point of cost, speed and simplicity of fabrication and operation. Storage systems presently utilized in commercial computers comprise, for example, magnetic cores or magnetic thin films in which the polarity of the remanent magnetism is reversible by the action of a control pulse thus causing the production or non-production of a pulse in a readout winding in response to an input pulse which affects the initial condition of the magnetization or storage. Crystal rectifiers have also been used in lieu of magnetic cores or films wherein the presence or absence of free-charge carriers is used as a memory feature. All of these storage systems have certain inherent limitations, such as switching or read-in and read-out speeds, severe drive requirements and reliability problems.

Capacitive storage systems have been proposed in the past wherein a capacitor is merely charged and subsequently discharged when read out, however, such a system is limited in that the read-out is destructive.

It has now been found that an improved capacitive storage element can be constructed utilizing two semiconductor diodes which are characterized by having variable capacitance depending upon the voltage there-across and a storage capacitor connected in circuit relationship with such diodes. In such an element short term non-destructive read-out storage may be achieved.

It is accordingly a primary objectt of the present invention to provide a variable capacitance information storage element.

It is a further object to provide such an element capable of high speed non-destructive read-out.

It is a still further object to provide such an element which requires low power read-in and read-out drive pulses.

The foregoing and other objects, features and advantages of the invention will be apparent from the following more particular description of a preferred embodiment of the invention, as illustrated in the accompanying drawings.

The objects of the present invention are accomplished in general by an information storage system utilizing the modulation of the capacitance of a storage element by storing a charge thereon and then interrogating the element while the charge is stored thereon. Such a storage element comprises a first and second variable capacitance semiconductor diode connected in front to back relationship between two word drive lines and a capacitor connected between the intersection of said diodes and a bit drive line. To read information into the storage element two coincident pulses of opposite polarity are fed into the word drive lines to bias both diodes in the same direction while concurrently therewith a pulse of positive or negative polarity is fed into the bit drive line. Depending upon the polarity of the bit pulse one of the diodes will be caused to conduct thereby storing a charge or bit of information of one polarity or the other at the intersection between the two diodes and the capacitor. To read information out of the storage element two similar pulses of opposite polarity are again fed to the word drive lines. Depending upon whether the stored charge is of positive or negative polarity there will be a greater voltage developed across the lower diode or the upper diode. Since the diodes are of the type whose capacitance varies with the voltage impressed there-across the diode having the greater voltage developed at the time of the read-out signal will transmit a greater charge than the other thereby creating an output pulse in the bit drive line of sign determined by the charge stored therein.

Figure 1:
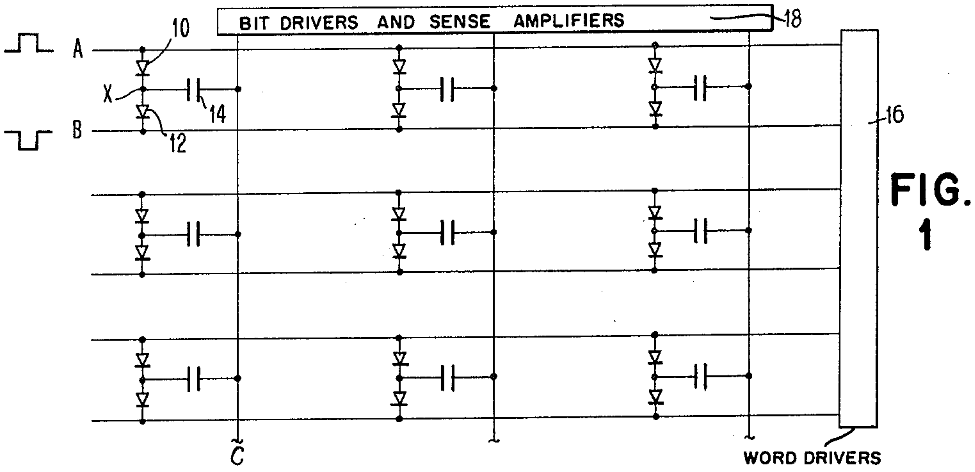
FIG. 1 is a schematic diagram of a variable capacitance memory constructed in accordance with the present invention.
Figure 2:
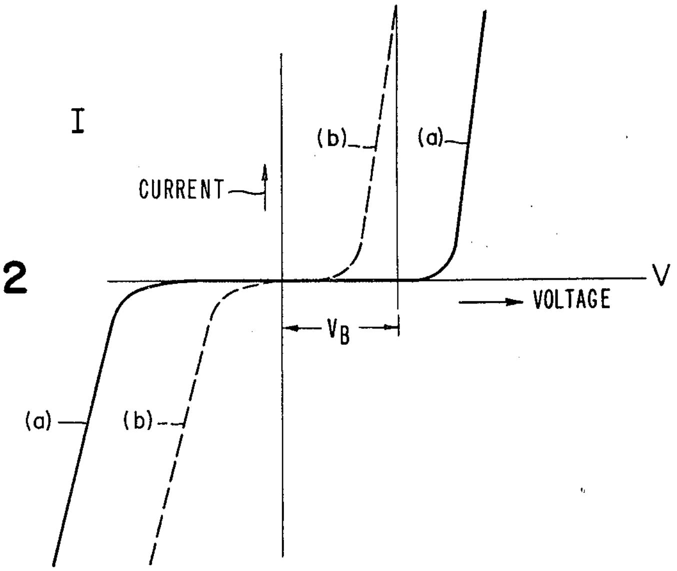
FIG. 2 shows the voltage current characteristics of a variable capacitance storage element as shown in FIG. 1.
Figure 3:
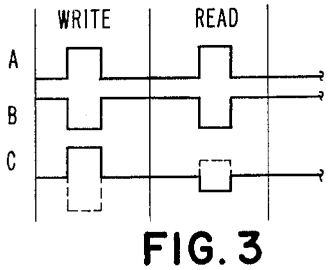
FIG. 3 illustrates a pulse program for operation of the memory of FIG. 1.

The operation of the storage element will be more fully understood by referring to FIGS. 1, 2 and 3. Referring to FIG. 1 there is shown a typical storage matrix utilizing the variable capacity storage element of the present invention. The storage element in the upper left hand corner of the matrix will be referred to for purposes of describing the operation of the invention. Diodes 10 and 12 are connected in front to back relationship between word drive lines A and B which are connected to the word drivers 16 and capacitor 14 is connected between the intersection X of the two diodes and bit drive line C which is connected to the bit drivers and sense amplifiers 18. Most semiconductor diodes exhibit a non-linear capacitance relative to voltage impressed thereacross. In the present invention a diode typified by a Hughes HC7002 has been successfully used in an operating example of the present storage element.

In operation, a pair of complementary voltage pulses from word drivers 16 is applied to word lines A and B, so that, in any cell, the upper electrode of 10 and the lower electrode of 12 are simultaneously driven positive and negative, respectively, by equal amounts. If 10 and 12 are similar, and no charge is stored, the circuit remains balanced and no voltage is developed at X. If a charge, positive for example, is placed at point X the capacitance of one of the diodes will be increased, and that of the other decreased, so that when the word lines A and B are pulsed a voltage is developed which is coupled by means of capacitor 14 to the bit line C. If a negative charge had been stored, a pulse of opposite polarity would have appeared on C. With the diodes connected as shown in FIG. 1, so that each diode is pulsed in the forward direction, the sign of the voltage developed at C is opposite to the charge stored. If the polarity were changed, so that the diodes were pulsed in the reverse direction, the voltage at C would be of the same sign as the stored charge. From the point of view of sensing the information stored in the cell, it makes no difference which polarity is employed as long as the diode conductance remains fairly small. The essential point is that the sign of the stored charge is sensed non-destructively by detecting the unbalance produced in a network of non-linear capacitors. The read-out is non-destructive because insufficient voltage is applied to allow electrons to flow through the diodes. The only current in the circuit is the displacement current due to the capacitance unbalance.

The time for which information can be stored is limited, even though reading is non-destructive, because the charge will eventually leak away from X though the conductance of 10, 12 and 14 in parallel.

In order to write into the store a charge must be placed at point X. In order to write rapidly in a particular address, the following scheme is used. The polarity of the diodes is chosen so that forward pulsing is used, but the pulse amplitude is limited so that each diode receives about half the voltage necessary to increase the conductance to a large value. The effect of this may be seen in FIG. 2, where the solid curve (*a*) represents the current-voltage characteristic measured between point X and ground in the absence of the word pulses, and the dotted curve (*b*) the characteristic while the pulses are applied. It should be understood that the curve of FIG. 2 represent the I-V characteristic looking into the storage cell at point X. The reason for the shift of the dotted curve (*b*) is the biasing effect of the coincident word drive pulses which reduces the magnitude of the bit-drive pulse necessary to drive either diode 10 or 12 into conduction. In actuality of course the I-V characteristics for the individual diodes is unchanged.

When a large pulse, comparable to the word drive pulses, is applied simultaneously to the bit line, a voltage will be developed at X which is sufficient to drive one of the diodes into forward conduction if, and only if, the word drive pulses are simultaneously present on that cell. This is shown in FIG. 2 by the fact that the voltage $V_b$ due to the bit drive is sufficient to cause a large current in case (*b*) but not in case (*a*). Thus in an array of such cells, a charge may be placed only on the cell which is at the intersection of a pair of pulsed word lines with a pulsed bit line. The sign of this charge is determined by the sign of the bit pulse. Therefore, it is possible to use an array of cells of the type described as an evanescent or short duration store with writing by coincident bit and word voltages, and reading by word-drive, bit-sense techniques.

FIG. 3 illustrates a typical pulse program for one of the storage elements as set forth above. The letters A, B and C refer to the two word-drive lines and the bit drive line respectively. It may be readily seen in this figure that the word and bit pulses in the portion marked "write" are coincident and that the bit-drive pulse C can assume either polarity. In the read portion the word-drive pulses are supplied from lines A and B and the output pulse on the bit line C is the resultant pulse due to the capacitance unbalance of the cell upon interrogation as set forth above. It will also be noted that for the forward bias pulsing mode of the word-drive that there is a phase reversal of the read-out pulse from the pulse read into the store.

It is clear from the nature of the storage cell that reading may be carried out extremely rapidly. The faster the word drive pulses, the better is the coupling between the stored charge and the voltage on the bit line. Reading speed is therefore limited only by external considerations, such as the difficulty of propagating fast drive and output pulses down transmission lines with periodic capacitance loading. A single storage unit has been read with a 2.5 nanosec. pulse and this speed was limited by oscilloscope response. In this example the two HC7002 diodes have a no bias capacitance of about 130 pf. and the capacitor 14 a capacitance of about 100 pf. A word drive of about .5 volt was utilized to give an output pulse of between 10 and 20 millivolts.

In extensive memory arrays, trouble is often caused by cross coupling between bit lines as a result of unwanted coupling between bit and word lines. This is avoided in the present storage array, because a stored 0 gives a signal which is full amplitude but opposite in sign to a 1, rather than a smaller signal of the same polarity as in some other systems.

The storage time of the system is quite long for such a store. When short word drive pulses are used, loss of charge during reading is negligible, and leakage is the only problem. Commercial diodes of the type (Hughes HC7002) used in the experiment commonly have leakage time constants of a few seconds, and storage of information for a time estimated as about 1 second has been observed experimentally. Thus a storage time of this order can be achieved in a complete memory without regeneration. It should also be noted that the storage time of a given cell is unaffected by the size of the memory. A 1 second store is sufficient for a large number of cycles of machine operation in modern high speed computers. Thus a memory constructed of storage cells of the type disclosed herein is ideally suited to a buffer store. If longer storage is needed, regeneration is possible, but only of one word as a time. Little power is dissipated in the cells during storage or reading.

In mechanical construction, each cell is theoretically suitable for development as an integrated storage cell component or possibly as a whole memory. The coupling capacitors can be made as p-n junctions as well as the variable capacitance elements.

While the invention has been particularly shown and described with reference to a preferred embodiment thereof, it will be understood by those skilled in the art that various changes in form and details may be made therein without departing from the spirit and scope of the invention.

What is claimed is:

1. A binary information storage matrix comprising a plurality of pairs of word drive lines and a plurality of bit drive lines, a plurality of storage elements connected between each bit drive line and each of said pairs of word drive lines, each said element comprising two variable capacitance semiconductor diodes connected in front to back relationship between the word drive lines and a capacitor connected between the junction between said two diodes and the bit drive line and means for coincidently applying two word and a bit pulse to said elements to write into said matrix and means for coincidently pulsing the word lines only to read out of said matrix the pulses applied to said word drive lines being insufficient to cause said semiconductor diodes to conduct.

2. A binary information storage matrix as set forth in claim 1 wherein the word drive pulses are of opposite polarity and bias the diodes in a forward direction but are insufficient to cause the diodes to conduct and the bit drive writing pulse is of such polarity as to selectively cause only one of the diodes to conduct.

3. A binary information storage element which comprises:

two variable capacitance semiconductor diodes connected in front to back relationship between a first and second signal input means, a capacitor connected between the junction between the two diodes and a third information input and read out means, means for applying opposite polarity pulses substantially equal in magnitude to the first and second signal input means, means for applying a write pulse to the third input means concurrently with said last named means, wherein said first two pulses are by themselves insufficient to cause either diode to conduct and wherein the third pulse will cause one of the two diodes to conduct depending upon the polarity of said pulse, means to apply two such pulses to said first two lines only to non-destructively read out information from said element, and means to sense a pulse appearing at said third input means.

References Cited by the Examiner

UNITED STATES PATENTS

| | | | |
|---|---|---|---|
| 2,823,368 | 2/58 | Avery | 340—173 |

(Other references on following page)

OTHER REFERENCES

National Bureau of Standards Report 2940; Holt, The Diode-Capacitor Memory, November 1953.

Electrical Manufacturing, volume 52, issue 5, Digital Memory Systems, by Auerbach, pages 136–143, November 1953.

Tele-Tech and Electronic Industries, volume 12, issue 11; Diode-Capacitor Memory for High Speed Computers, pages 85, 138–140, November 1953.

Electronic Design, May 1955, Gas-Diode Memories, pages 50–52.

IRVING L. SRAGOW, *Primary Examiner.*